United States Patent [19]

Treude

[11] Patent Number: 5,782,321
[45] Date of Patent: Jul. 21, 1998

[54] AUTOMATICALLY ADJUSTABLE BRAKE STOP

[75] Inventor: Hans-Walter Treude, Wilnsdorf, Germany

[73] Assignee: Bubenzer Bremsen Gerhard Bubenzer Ing. GmbH, Freudenberg, Germany

[21] Appl. No.: 665,320

[22] Filed: Jun. 17, 1996

[30] Foreign Application Priority Data

Jun. 16, 1995 [DE] Germany ............ 195 21 553.2

[51] Int. Cl.[6] .................................................. F16D 65/52
[52] U.S. Cl. ................................ 188/71.8; 188/196 B
[58] Field of Search ..................... 188/71.8, 71.9, 188/196 R, 196 C, 196 B, 196 P, 196 D, 196 BA, 196 V

[56] References Cited

U.S. PATENT DOCUMENTS

| | | |
|---|---|---|
| 3,908,803 | 9/1975 | Otto et al. ............... 188/71.8 |
| 3,986,584 | 10/1976 | Wright et al. ............ 188/71.8 |
| 4,029,179 | 6/1977 | Butz ...................... 188/71.8 |
| 4,473,136 | 9/1984 | Emilsson et al. ......... 188/71.8 |
| 4,527,666 | 7/1985 | Emilsson ................ 188/76.8 |

OTHER PUBLICATIONS

Prospectus "Scheibenbremse SB 14" of Bubenzer Bremsen, published in 1992.

*Primary Examiner*—Matthew C. Graham
*Attorney, Agent, or Firm*—Young & Thompson

[57] ABSTRACT

A brake with an automatically adjustable stop (15) which interacts with a counterstop on base frame (2) and which is coupled to brake disk (3) for readjustment of brake jaw (5) in its venting position according to the wear which has occurred on brake linings (12).

2 Claims, 6 Drawing Sheets

AUTOMATICALLY ADJUSTABLE BRAKE STOP

BACKGROUND OF THE INVENTION

The invention relates to brakes made as disk or drum brakes for installation in drives in industrial plants, cable railway drives or the like, with a brake disk or a brake drum which is located on a drive shaft or a driven shaft, at least one braking force generator made as brake springs for closing a brake jaw via a lever system in the braking process, with two brake levers or brake lever pairs which act with brake linings attached to interchangeable brake shoes on the peripheral area of the brake disk or brake drum, a venting device assigned to the brake springs for opening the brake jaw by means of the lever system when the brakes are released, an automatic reset device for the brake levers for equalizing brake lining wear and an adjustment device with at least one stop which is located on the lower end of a brake lever connected to the base frame of the brakes and which can be moved against the base frame or a counterstop attached to it for adjustment of the brake jaw to the brake disk or brake drum in ventilated brakes.

Disk and drum brakes of this type which are known by the brochures "Disk Brakes SB 14" and "Drum Brakes EBN" from Bubenzer Bremsen Gerhard Bubenzer Ing. GmbH have brake jaws with two brake levers or brake lever pairs for readjustment of the brake jaw to the brake disk or brake drum in ventilated brakes after further closing of the brake levers caused by the automatic reset device for equalizing the brake lining wear which are equipped with fixed stops on the lower brake lever end which interact with counterstops on the base frame of the brakes and which are readjusted by hand by means of set screws according to the respective brake lining wear.

SUMMARY OF THE INVENTION

The object of the invention is to further develop the generic disk and drum brakes with respect to a fully automatic operating mode.

This object is achieved according to the invention by the generic disk and drum brakes which are equipped with a stop which can be automatically adjusted in brake lining wear reset of the brake levers on at least one brake lever or an automatically adjustable counterstop on the base frame for readjustment of the brake jaws in their venting position.

The invention includes advantageous and feasible embodiments of the automatically adjustable stop or counterstop.

The automatically adjustable stop which is preferably attached to the brake lever or brake lever pair which faces away from the venting device and the automatically adjustable counterstop which is attached to the base frame enable automatic readjustment of the brake jaw with respect to the brake disk or the brake drum in the venting position of the brakes after the brake levers are contracted by an automatic reset device according to the wear which has occurred on the brake linings. The stop can accommodate large stop forces up to six kilonewtons and can equalize the elasticities which occur during operation in the brake levers of the brake jaw and the lever system for opening and closing the brake jaw.

BRIEF DESCRIPTION OF THE DRAWING

The invention is explained here using a disk brake which is shown in the drawings.

DESCRIPTION OF THE PREFERRED EMBODIMENTS

Figure 1:
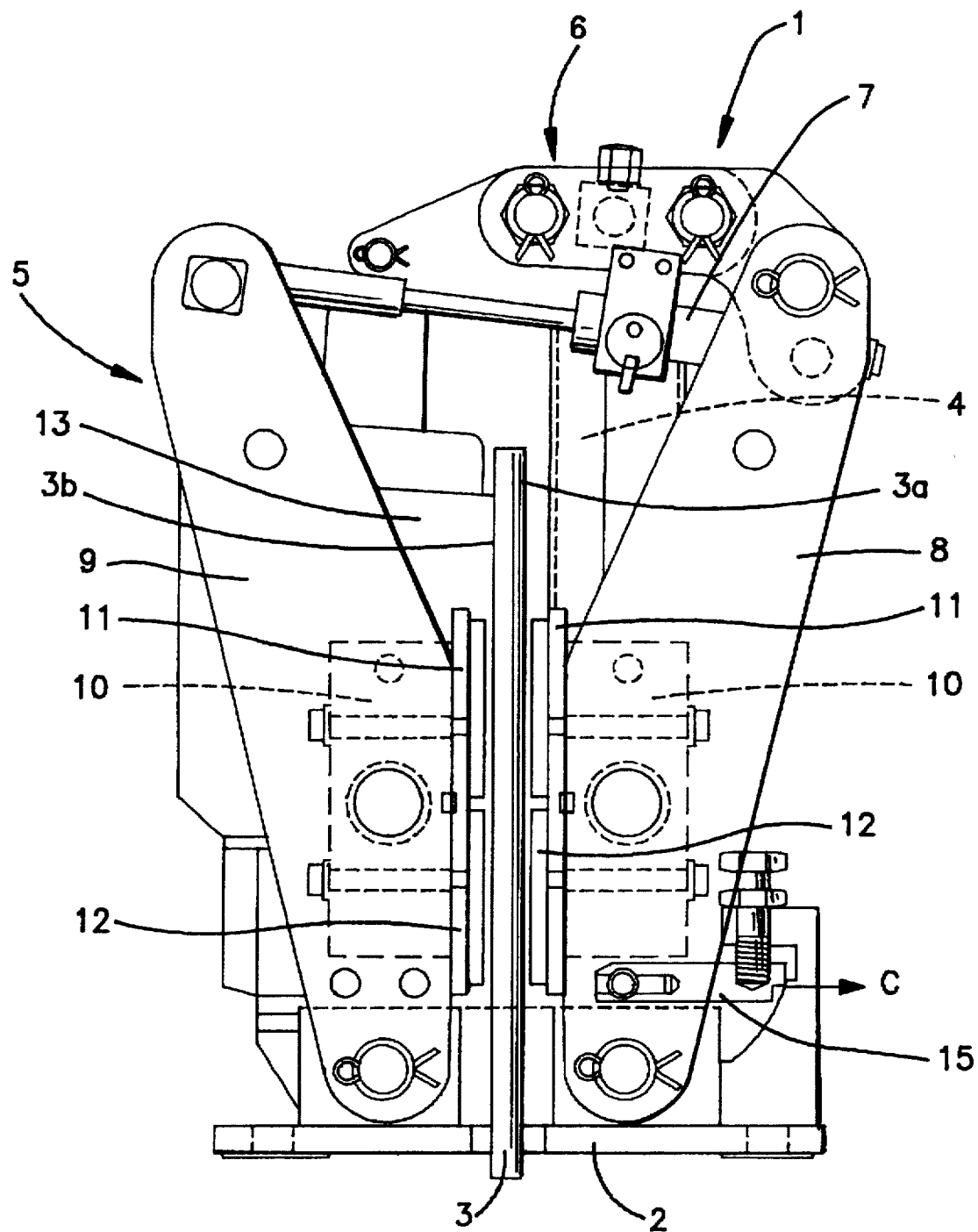
FIG. 1 shows a side view of a disk brake which is equipped with an automatic stop of a first embodiment for a brake lever or brake lever pair.

Partially lined disk brake 1 attached on base frame 2 according to FIG. 1 for installation in drives of conveyor belts, crane systems, cable cars, machine tools and so forth has as the main components brake disk 3 which is located on a drive shaft or driven shaft, furthermore brake spring 4 for closing brake jaw 5 in the braking process via lever system 6 which is equipped with automatic lining wear reset device 7, in which two brake lever pairs 8, 8; 9, 9 of brake jaw 5 via brake shoes 10 hinged to brake levers 8, 9 with brake linings 12 attached on interchangeable carriers 11 act on the peripheral area of two brake disk surfaces 3a, 3b, and a venting device 13 for opening of brake jaw 5 via lever system 6 when brake 1 is released.

On bottom end 14 of one brake lever 8 of brake lever pair 8, 8, lever 8 coupled to base frame 2, which faces away from venting device 13, automatically adjustable stop 15 which interacts with counterstop 16 on base frame 2 is coupled for readjustment of brake jaw 5 in its venting position to brake disk 3 after contracting two brake lever pairs 8, 8; 9, 9 by automatic reset device 7 according to the wear which has occurred on brake linings 12.

Figure 2:
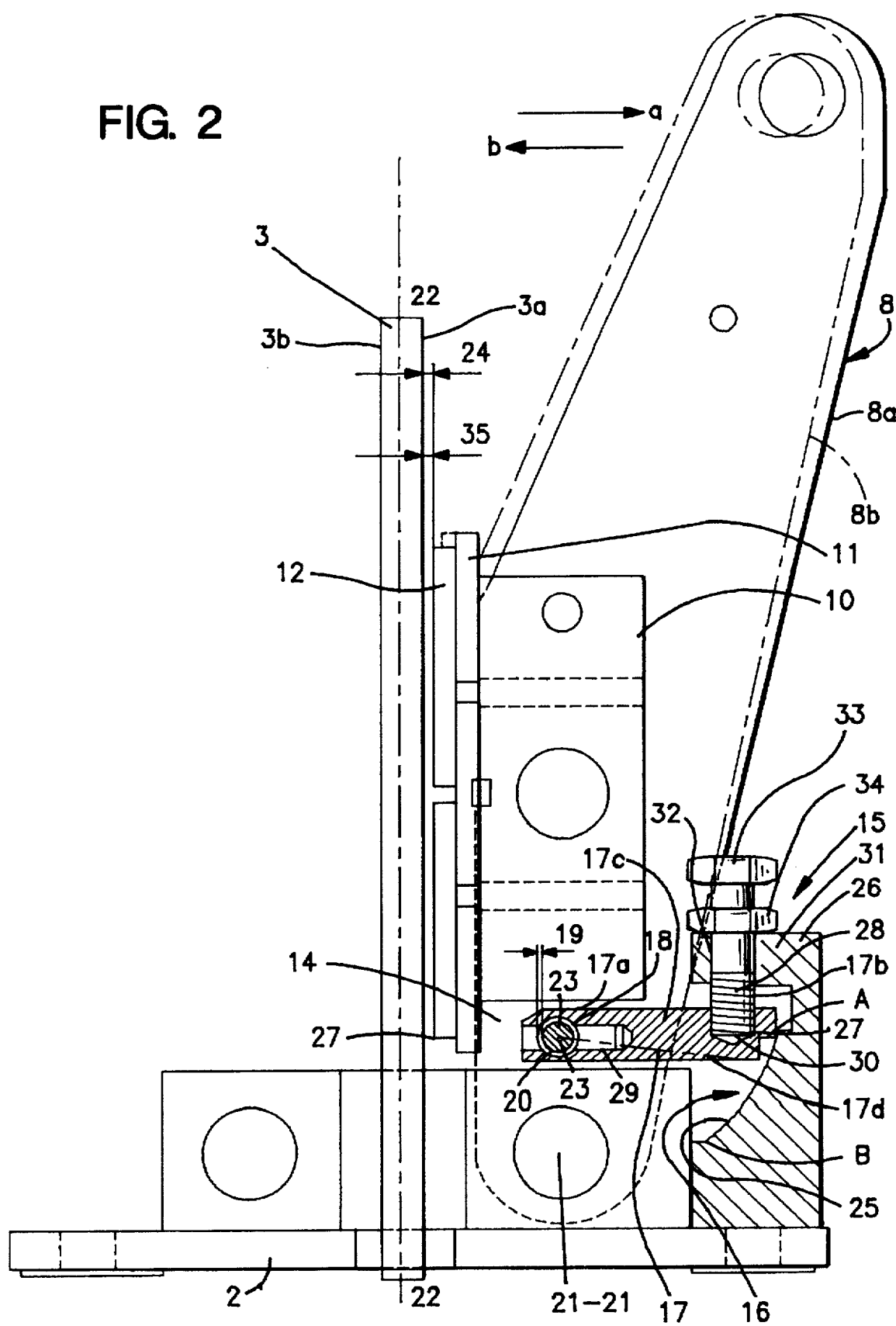
FIG. 2 shows an enlarged longitudinal section representation of the stop according to FIG. 1.

Automatically adjustable stop 15 which is shown in FIG. 2 has adjustment crank 17 with inner end 17a which is provided with bearing bore 18 and which is pivotally mounted with play 19 on stop pin 20 which is located between brake levers 8, 8 and between their swivel axis 21—21 and brake shoe 10, which is screwed to two brake levers 8, 8, and which is located parallel to base frame 2 of brake 1 in plane 23—23 which is parallel to brake disk plane 22—22.

Bearing play 19 between bearing bore 18 of adjustment crank 17 and stop pin 20 corresponds to venting and closing stroke 24 of brake shoe 10 or brake lever 8 which is reduced according to the leverage of brake levers 8, 8.

Outer end 17b of adjustment crank 17 abuts guide curve 25 which runs in bracket 26 which is attached on base frame 2 of brake 1 in a plane parallel to the swivel planes of two brake levers 8 from upper point A which is located in the area of horizontal plane 27—27 of stop pin 20 to lower point B which is offset to the inside in the direction to brake disk plane 22—22. Outer end 17b of adjustment crank 17, the end abutting guide curve 25, is acted upon by adjustment spring 28 which is made as a compression and friction spring and which acts perpendicularly to the crank plane. Adjustment crank 17 is pressed with bearing bore 18 against stop pin 20 by prestressed compression spring 29 which acts transversely to stop pin 20 and which is inserted into the crank, in the direction of venting movement a of two brake levers 8.

Adjustment spring 28 which acts on outer end 17b of adjustment crank 17 sits in blind hole 30 of adjustment crank 17 and in threaded through hole 32 of retaining clip 31 on bracket 26 with guide curve 25. The prestress of adjustment spring 28 can be set by means of set screw 33 which is screwed into threaded through hole 32 of retaining clip 31 of bracket 26, the set screw being secured by locknut 34.

Before starting up brake 1 adjustment crank 17 is set such that in the venting position of brake jaw 5 between two brake disk surfaces 3a and 3b and brake linings 12 on lining carriers 11 on two brake lever pairs 8, 8; 9, 9 there is stipulated air gap 35 each. In this initial venting position of brake jaw 5 two brake levers 8 assume position 8a and adjustment crank 17 of stop 15, the crank attached to the two brake levers, assumes an almost horizontal position 17c in which outer end 17b of adjustment crank 17 in the area of upper end point A is supported on guide curve 25. During operation of brake 1 in the venting position of brake jaw 5 as a result of the arrangement of venting device 13 with reference to lever system 6 for opening and closing of brake jaw 5 and the kinematics of lever system 6, stop force C which occurs always acts on brake lever pair 8, 8 so that two brake lever pairs 8, 8 and 9, 9 are adjusted by adjustment crank 17 of stop 15 on brake levers 8 with reference to brake disk 3 and in this way oscillating motion of brake jaw 5 in the venting position of the brake is precluded. In initial operation without occurrence of brake lining wear two brake levers 8, 8 execute a closing motion in the direction of arrow b and a venting motion in the direction of arrow a with constant closing and venting stroke 24 which is enabled by bearing play 19 of stop pin 20 which is attached to brake levers 8, 8 in bearing bore 18 of adjustment crank 17. As soon as brake lining wear occurs during longer operation, first of all the closing stroke increases during the closing motion of brake lever 8 in arrow direction b by the thickness of the lining wear, stop pin 20 attached to brake levers 8 moves accordingly to the inside in the direction to brake disk 3 and in doing so entrains adjustment crank 17, swivels the latter when stop force C is cancelled due to its inherent weight and the compressive force exerted on external crank end 17b by adjustment spring 28 around stop pin 20 along guide curve 25 to the inside into position 17d and two brake lever pairs 8, 8 and 9, 9 are contracted by automatic reset device 7 by the amount of lining wear in the direction to two brake disk surfaces 3a and 3b such that two brake levers 8 when brake 1 is vented assume position 8b which is swivelled to the inside in closing direction b and which is readjusted according to the brake lining wear and brake jaw 5 with two brake lever pairs 8, 8 and 9, 9 is fixed by stop 15.

The above described automatic readjustment of the venting position of brake lever pairs 8, 8 and 9, 9 of brake 1 is repeated with any new brake wear.

The spring force of adjustment spring 28 formed as a friction spring can be set by means of set screw 33 so that both fluctuations of the coefficient of friction between adjustment crank 17 and guide curve 25 as well as different elasticities of lever system 6 of brakes 1 can be equalized.

Figure 3:
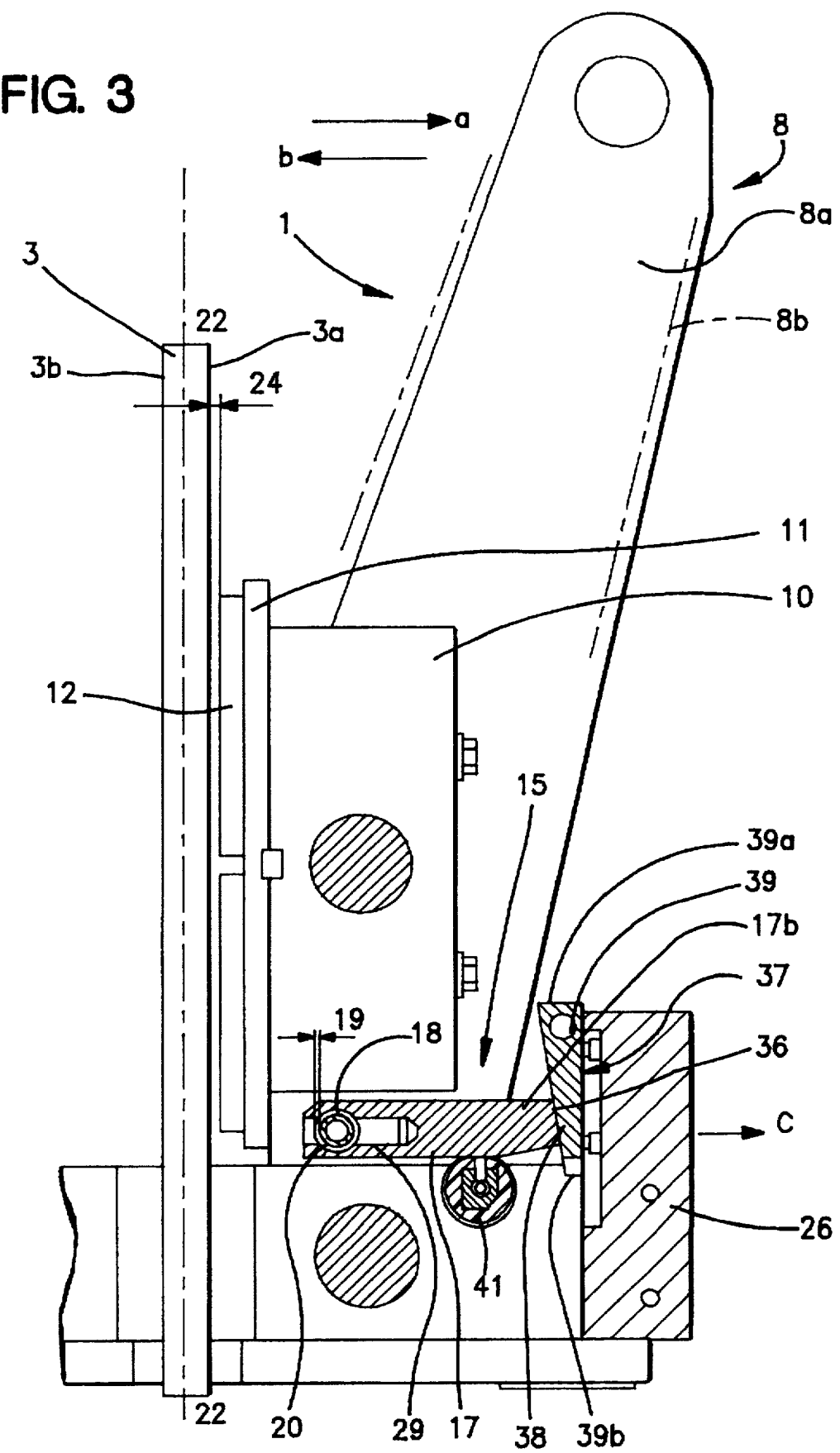
FIG. 3 shows an enlarged longitudinal section representation of a disk brake with an automatically adjustable counterstop for a brake lever.

Partially lined disk brake 1 shown in FIG. 3, is like the brakes according to FIGS. 1 and 2, as stop 15 has adjustment crank 17 with inner end 17a provided with bearing bore 18 which is pivotally mounted with play 19 on stop sleeve 20 which is located between brake levers 8, 8 and is attached to them, bearing play 19 corresponding to venting and closing stroke 24 of brake shoe 10 or brake lever 8 which is reduced according to the leverage of brake levers 8, 8, and adjustment crank 17 with bearing hole 18 being pressed against stop sleeve 20 in direction a of the venting motion of brake levers 8, 8 by prestressed compression spring 29 which acts transversely to stop sleeve 20 and which is inserted into the crank.

Outer end 17b of adjustment crank 17 with inclined surface 36 abuts corresponding oblique opposite surface 38 of automatically adjustable counterstop 37 which is made as adjustment key 39 which is movably guided parallel to brake disk plane 22—22 in bracket 26 which is attached to base frame 2 of brake 1.

Lockable eccentric pulley 41 which is supported in base frame 2 of brake 1 and which abuts bottom 40 of adjustment crank 17 is used to align the adjustment crank.

As soon as brake lining wear occurs, first of all the closing stroke increases during the closing motion of brake levers 8 in arrow direction b by the thickness of the lining wear, stop pin 20 attached to brake levers 8 moves accordingly to the inside in the direction to brake disk 3 and in doing so entrains adjustment crank 17, adjustment key 39 slips when stop force C is cancelled due to its inherent weight from position 39a down into position 39b and two brake lever pairs 8, 8 and 9, 9 are contracted by automatic reset device 7 by the amount of lining wear in the direction to two brake disk surfaces 3a and 3b, such that the two brake levers when brake 1 is vented assume position 8b which is swivelled to the inside in closing direction b and which is readjusted according to the brake lining wear and brake jaw 5 with two brake lever pairs 8, 8 and 9, 9 is fixed by counterstop 37.

Figure 4:
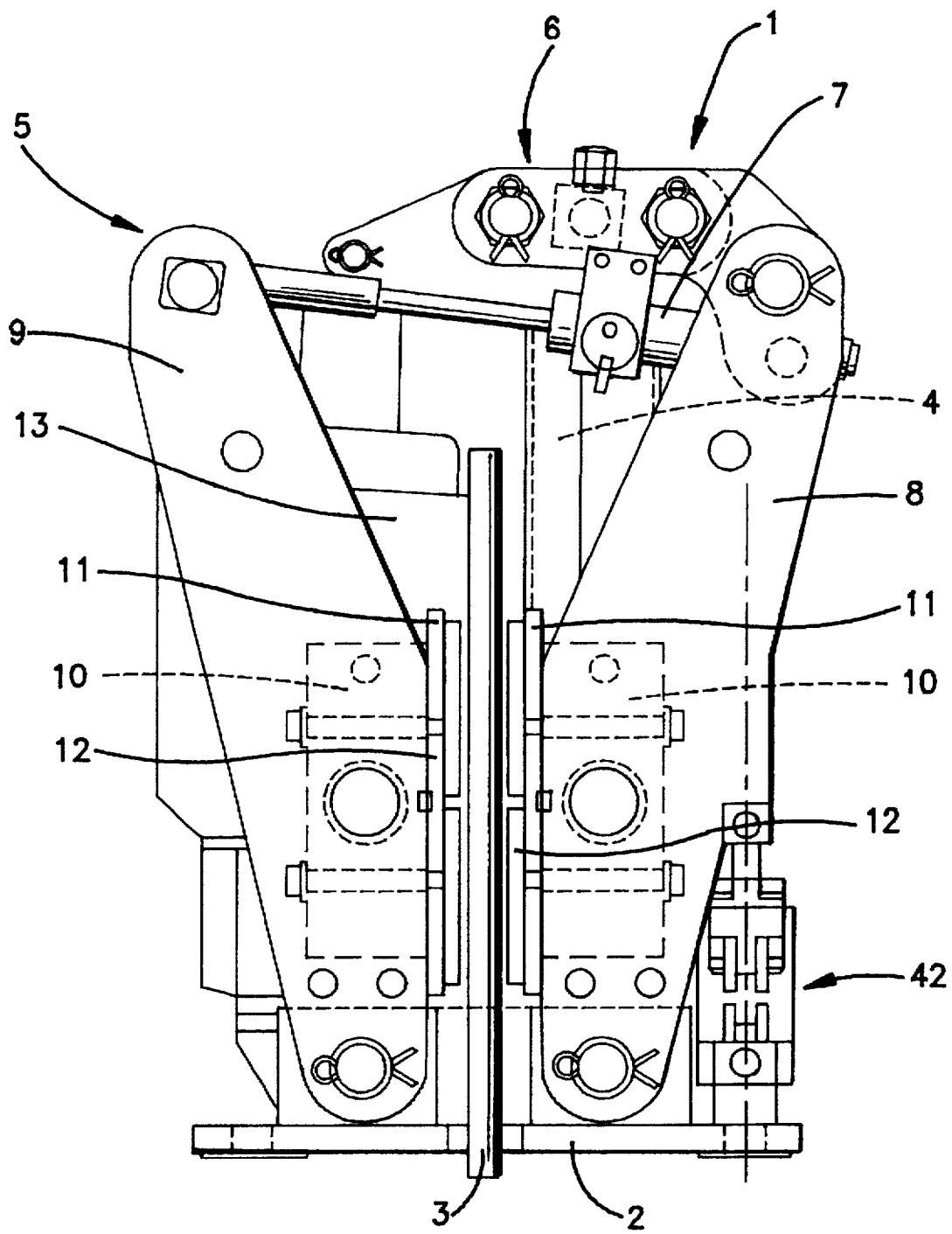
FIG. 4 shows a side view of a disk brake with an automatically adjustable stop of another embodiment for a brake lever.
Figure 5:
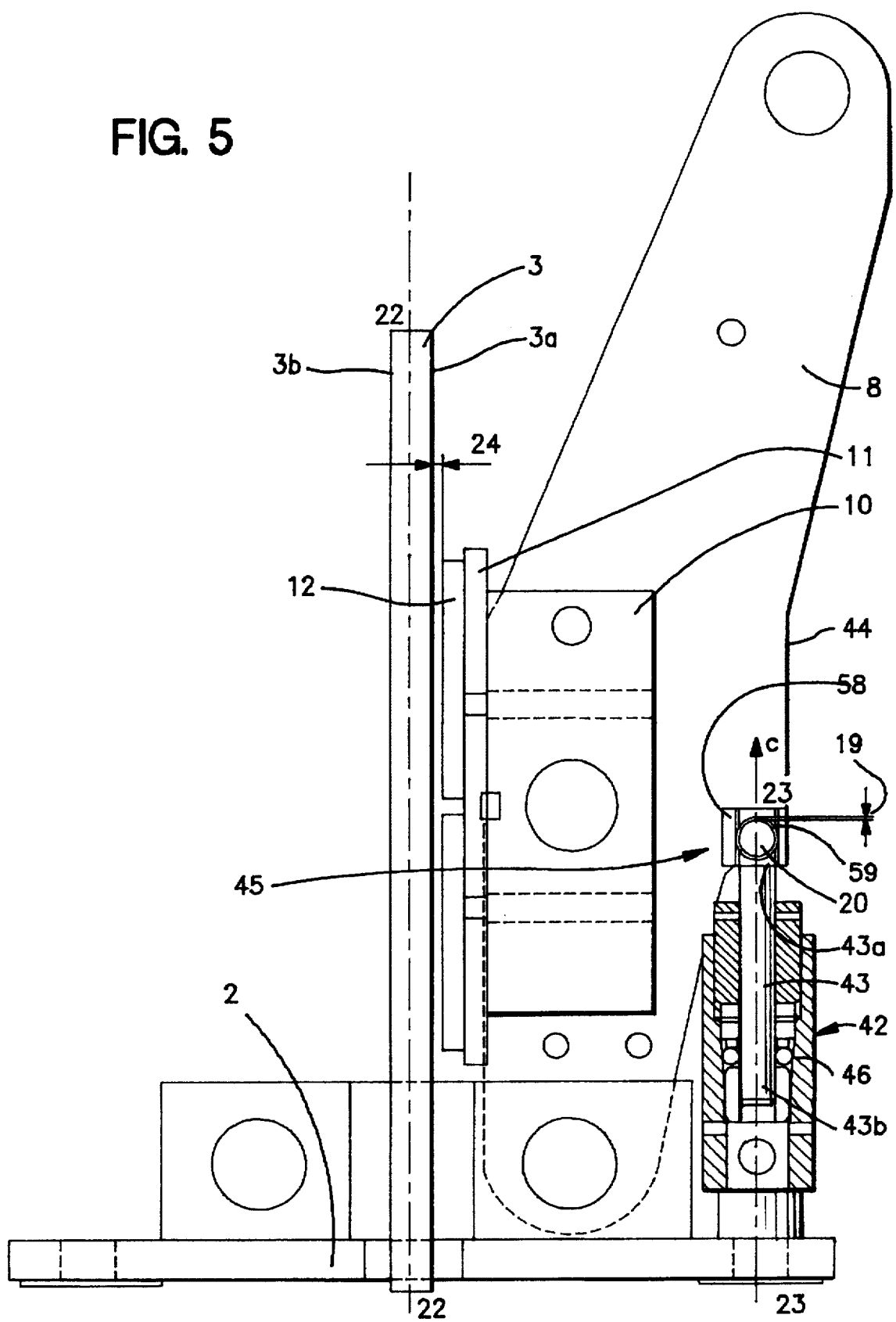
FIG. 5 shows a side view of the brake lever with the stop according to FIG. 4 in an enlarged representation and FIG. 6 shows the linear freewheel of the stop according to FIGS. 4 and 5 in a longitudinal section.
Figure 6:
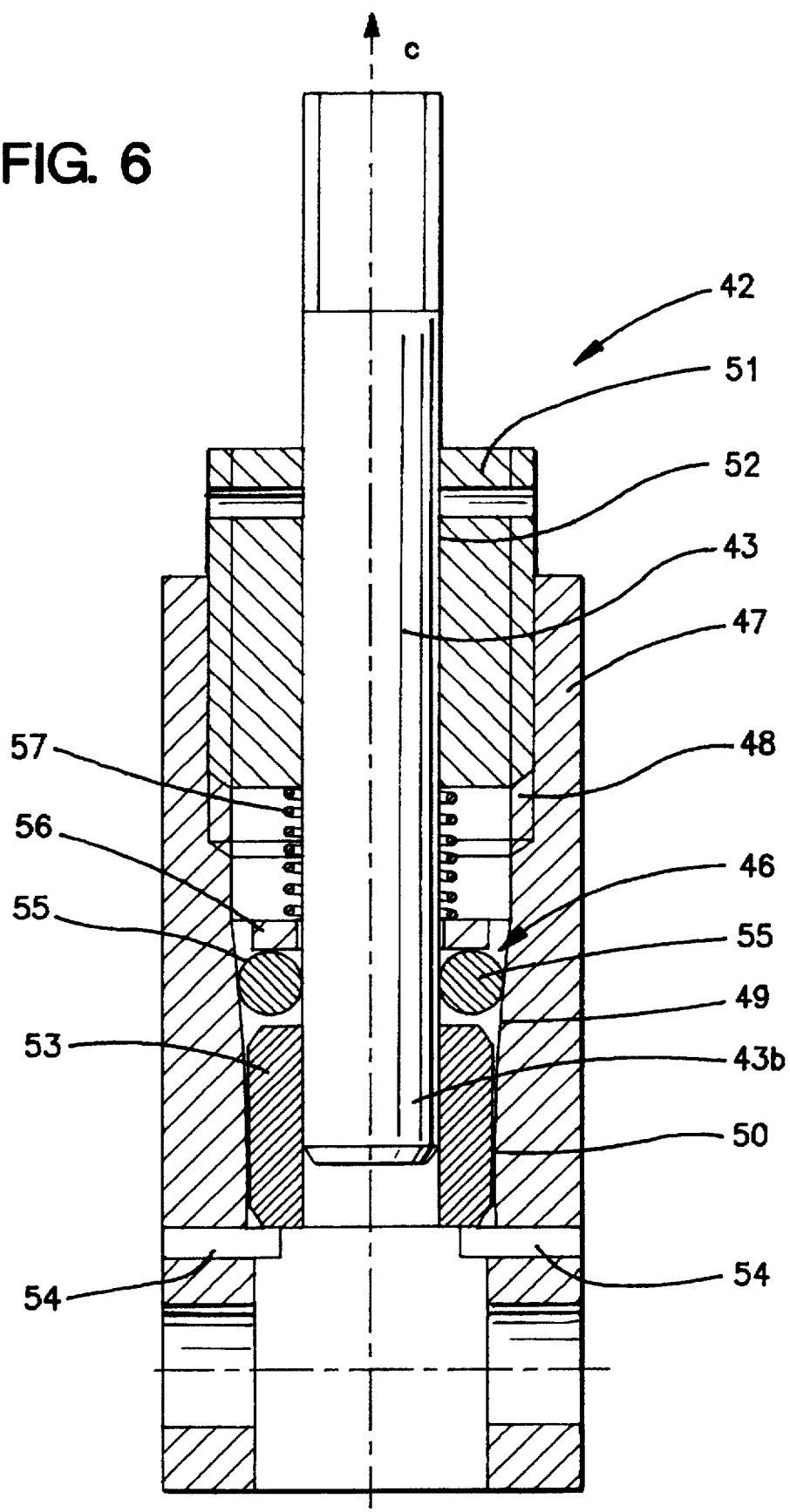

Partially lined disk brake 1 according to FIG. 4 is equipped with automatically adjustable stop 42 of a second embodiment which is shown enlarged in FIGS. 5 and 6 and which has telescoping adjustment rod 43 which is made as a plunger rod and which is located parallel or almost parallel to brake disk plane 22—22. Upper end 43a of adjustment rod 43 is coupled with play 19 to outside 44 of brake lever pair 8, 8 which faces away from brake shoe 10, bearing play 19 of knuckle joint 45 between brake lever pair 8, 8 and adjustment rod 43 corresponding roughly to venting and closing stroke 24 of brake shoe 10 or brake lever 8. Lower end 43b of adjustment rod 43 is supported in linear freewheel 46 which is coupled to base frame 2 of brake 1 and which enables feed motion of adjustment rod 43 in direction c upward in a larger closing motion of brake lever 8 which is caused via normal closing stroke 24 of brake lever 8 in case of lining wear and locks adjustment rod 43 in the fed position against stop force C which is transmitted by brake levers 8 when brake 1 is vented.

Linear freewheel 46 of adjustment rod 43 has cylindrical housing 47 with upper threaded hole 48 which emerges via conical hole section 49 in cylindrical lower hole 50 which is reduced in diameter compared to threaded hole 48. Threaded sleeve 51 with through hole 52 for holding adjustment rod 43 is screwed into threaded hole 48 and sits with its lower end 43b in unlocking sleeve 53 which is inserted in lower hole 50 of housing 47 and is secured in the latter against falling out by radially inserted pins 54. Adjustment rod 43 is held in conical hole section 49 by interlock balls 55 on which interlock spring 57 which is made as a compression spring acts via compression ring 56 in the direction of the taper of conical hole section 49, in which the prestress of interlocking spring 57 can be set by means of threaded sleeve 51.

Adjustment rod 43 is coupled by means of headpiece 58 which has hole 59 with play 19 to stop pin 20 which is attached between two brake levers of brake lever pair 8, 8 and runs parallel to base frame 2 of brake 1 in plane 23—23 which is parallel to brake disk plane 22—22.

Linear freewheel 46 is unlocked by pressing unlocking sleeve 53 up.

Automatically adjustable stops 15, 37 and 42 of brake levers 8 described above in conjunction with partially lined disk brakes 1 can also be used in drum brakes.

What is claimed is:

1. In a brake having at least one braking force generator with brake springs for closing a brake jaw via a lever system in the braking process, with at least two brake levers which act with brake linings attached to interchangeable brake shoes on the peripheral area of the brake, a venting device assigned to the brake springs for opening the brake jaws by means of the lever system when the brakes are released, an automatic reset device for the brake levers for equalizing brake lining wear and an adjustment device with at least one stop which is located on the lower end of a brake lever connected to the base frame of the brake and which is movable for adjustment of the brake jaw, the improvement wherein:

the stop is automatically adjustable during brake lining wear reset of the brake levers for readjustment of the brake jaw in its venting position; and the stop (15) has adjustment crank (17) with inner end (17a) which is provided with bearing bore (18) and which is pivotally mounted with play (19) on stop means (20) which is located between brake levers (8, 8) and between swivel axis (21—21) and brake shoe (10) of brake lever pair (8, 8), which is joined to brake levers (8, 8) and which is located parallel to base frame (2) of brake (1), bearing play (19) of adjustment crank (17) on stop means (20) corresponding to venting and closing stroke (24) of brake shoe (10) which is reduced according to the leverage of brake levers (8, 8), outer end (17a) of adjustment crank (17) with inclined surface (36) abutting corresponding oblique opposite surface (38) of automatically adjustable counterstop (37) which comprises adjustment key (39) which is movably guided parallel to brake disk plane (22—22) in bracket (26) which is attached to base frame (2) of brake (1), oblique surface (36) in outer end (17b) of adjustment crank (17) for being aligned to oblique opposite surface (38) of adjustment key (39) by means of an adjustment device, and wherein adjustment crank (17) is pressed with bearing bore (18) against stop means (20) by prestressed compression spring (29) which acts transversely to stop means (20) and which is inserted into the crank, in direction (a) of the venting movement of brake levers (8, 8).

2. The brake according to claim 1, wherein said adjustment device comprises a lockable eccentric pulley (41) which is supported by base frame (2) of brake (1) and which abuts bottom (40) of adjustment crank (17) to align adjustment crank (17).

* * * * *